(12) United States Patent
Challoner

(10) Patent No.: US 6,842,153 B2
(45) Date of Patent: Jan. 11, 2005

(54) INSTRUMENT ALIGNMENT DEVICES AND METHODS

(75) Inventor: A. Dorian Challoner, Manhattan Beach, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/439,364

(22) Filed: May 16, 2003

(65) Prior Publication Data

US 2003/0206139 A1 Nov. 6, 2003

Related U.S. Application Data

(62) Division of application No. 09/862,882, filed on May 21, 2001, now Pat. No. 6,621,460.

(51) Int. Cl.[7] ............................ H01Q 3/00; H01C 19/00
(52) U.S. Cl. .................... 343/766; 73/503.3; 73/504.08; 73/504.18
(58) Field of Search ..................... 343/866; 342/175, 342/184, 194; 73/503.3, 504.08, 504.18, 503, 504.14; H01Q 3/00; H01C 19/00

(56) References Cited

U.S. PATENT DOCUMENTS

| | | | |
|---|---|---|---|
| 3,633,003 A | * 1/1972 | Talwani | 702/97 |
| 3,849,895 A | * 11/1974 | Bos | 33/317 D |
| 5,061,936 A | 10/1991 | Suzuki | 342/359 |
| 5,115,570 A | 5/1992 | Krogmann et al. | 33/326 |
| 5,197,331 A | * 3/1993 | Oikawa | 73/504.12 |
| 5,225,839 A | 7/1993 | Okurowski et al. | 342/174 |
| 5,245,347 A | 9/1993 | Bonta et al. | 342/149 |
| 5,272,922 A | 12/1993 | Watson | 75/504.16 |
| 5,347,286 A | 9/1994 | Babitch | 342/359 |
| 5,349,856 A | * 9/1994 | Nakamura | 73/504.12 |
| 5,351,060 A | 9/1994 | Bayne | 343/766 |
| 5,363,700 A | 11/1994 | Joly et al. | 73/504.18 |
| 5,485,169 A | 1/1996 | Kitabatake et al. | 343/765 |
| 5,517,204 A | 5/1996 | Murakoshi et al. | 343/765 |
| 5,557,285 A | 9/1996 | Bender et al. | 342/359 |
| 5,594,460 A | 1/1997 | Eguchi | 343/765 |
| 5,806,195 A | 9/1998 | Uttecht et al. | 33/304 |

* cited by examiner

Primary Examiner—Don Wong
Assistant Examiner—Trinh Vo Dinh
(74) Attorney, Agent, or Firm—Gates & Cooper LLP

(57) ABSTRACT

An apparatus for determining an instrument boresight azimuth heading. A typical apparatus comprises a gyro having a first input and a first output and a rocking angle generator having a second output, wherein the second output is communicatively coupled to the first input of the gyro, producing a demodulated signal at the first output. A signal multiplier is communicatively coupled to the second output and the demodulated signal for multiplying the second output and the demodulated signal and producing a multiplied signal and a filter communicatively coupled to the multiplied signal for producing a filtered output.

3 Claims, 6 Drawing Sheets

INSTRUMENT ALIGNMENT DEVICES AND METHODS

CROSS-REFERENCE TO RELATED APPLICATIONS

This application claims the benefit under 35 U.S.C. § 120 and is a division of the following and commonly-assigned U.S. patent application, which is incorporated by reference herein:

U.S. application Ser. No. 09/862,882, filed May 21, 2001, by A. Dorian Challoner, entitled "Instrument Alignment Devices and Methods", now U.S. Pat. No. 6,621,460, issued Sep. 16, 2003.

BACKGROUND OF THE INVENTION

1. Field of the Invention

The present invention relates to systems and methods for aligning instrument boresights, and in particular to a system and method for aligning a dish antenna boresight.

2. Description of the Related Art

Conventional systems and methods of satellite dish alignment require that a user approximate the pointing direction of the antenna from external sightings or a magnetic compass and then search for an antenna signal null. This process must be repeated until an adequate pointing accuracy is achieved.

For example, the antenna alignment method employed by satellite broadcasters such as DIRECTV, typical of conventional methods, requires approximate alignment of the antenna toward the satellite based on estimated directions depending upon the user's location on the Earth. Fine alignment of the antenna, e.g. within 0.1°, is then achieved in conjunction with the receiver/decoder of the system based upon maximizing the strength of the received signal. However, strength of the received signal may not be an accurate indicator of the satellite direction. Furthermore, it is very difficult to align a receiving antenna to a broadband antenna with a narrow beamwidth as the margin for error is very small; physical manipulation of the antenna often results in overshooting the intended position.

In addition, the conventional systems and methods will not acquire a mean position if the transmitting antenna is moving, such as with systems based upon high-altitude platforms or non-geostationary satellites.

Gyrocompassing methods have also been used to align instrument boresights as described in U.S. Pat. No. 5,272,922, issued Dec. 28, 1993, which is hereby incorporated by reference. However, such systems are very complex and expensive.

There is a need in the art for systems and methods for simple, accurate and inexpensive instrument alignment without the attendant difficulties described above. There is further a need for self-contained systems and methods of instrument alignment. There is still further a need for systems and methods for aligning instruments to a station position (satellite or other) whose apparent position is not stationary over time, or whose signal may not be present at the time of alignment.

The present invention satisfies these needs.

SUMMARY OF THE INVENTION

To address the requirements described above, the present invention discloses apparatuses and methods for determining an instrument boresight heading which can be used in aligning an antenna with respect to Earth coordinates.

One embodiment of the invention comprises an instrument having a boresight, an elevation positioner for positioning the elevation of the instrument boresight having an elevation axis, an azimuth positioner for positioning the azimuth of the instrument boresight having an azimuth axis and a sensor including a gyro having a sensitive axis.

One method of the invention comprises recording a first output of a gyro of an azimuth positioner having an instrument boresight azimuth heading in a first position, rotating the azimuth positioner to a second position, recording a second output of the gyro and rotating the azimuth positioner to a third position, recording a third output of the gyro and determining the azimuth heading relative to true north from the first, second and third output.

The foregoing allows simple, accurate alignment of antennas based upon a local vertical direction and the direction of the Earth's rotation.

BRIEF DESCRIPTION OF THE DRAWINGS

Referring now to the drawings in which like reference numbers represent corresponding parts throughout.

DETAILED DESCRIPTION INCLUDING PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Apparatus and Method of Antenna Alignment

Figure 1:
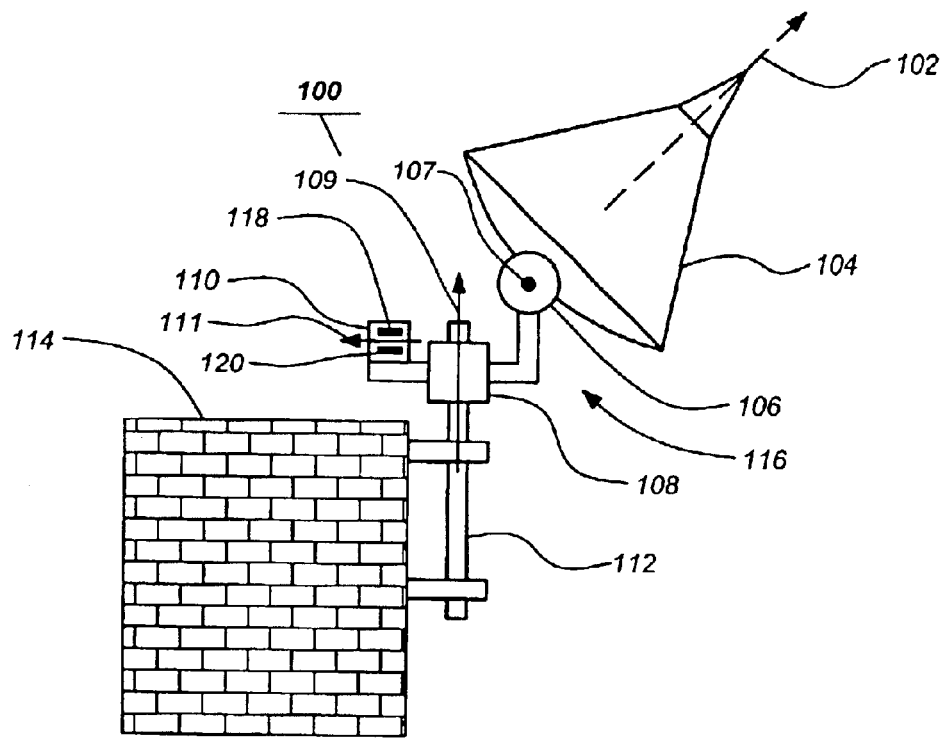
FIG. 1 illustrates an example antenna alignment apparatus of the invention.

FIG. 1. illustrates a typical antenna alignment apparatus of one embodiment of the invention. In this embodiment a vertical post 112 is clamped via brackets to a building wall or some other suitable mounting surface of a stable structure 114. The instrument 104 with a boresight 102, a dish antenna for example, is mounted to the vertical 112 post via an azimuth and elevation gimbal 116 comprising an azimuth positioner 108 and an elevation positioner 106. The rotation axis 109 of the azimuth positioner 108 is substantially parallel to the vertical direction and the rotation axis 107 of the elevation positioner 106 is substantially perpendicular to both the azimuth positioner 108 rotation axis 109 and the vertical axis.

An antenna alignment sensor 110 is fastened to the azimuth positioner 108 and comprises a gyro 118 aligned with an accelerometer 120. A sensitive axis 111 is normal to the azimuth positioner 108 rotation axis and elevation positioner 106 rotation axis. The azimuth of the instrument 104 boresight 102 is aligned by rotating azimuth positioner 108 to a plurality of different positions to obtain an output of the gyro 118 at each position. In a typical embodiment, three different positions are used.

Figure 2:
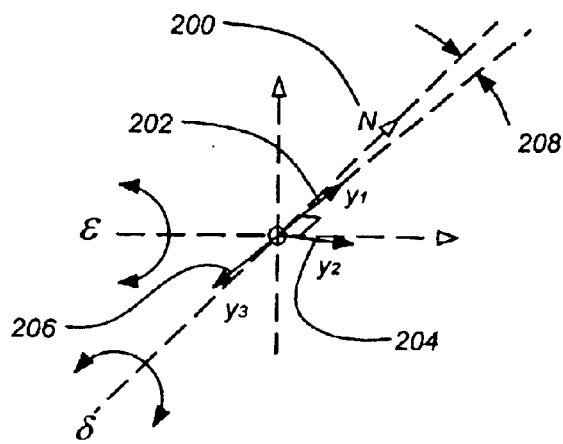
FIG. 2 illustrates the first, second and third positions for one embodiment of the invention.

FIG. 2 illustrates the example first, second and third positions 202, 204, 206 for one embodiment of the invention. For computational and analytical convenience, relative azimuth positions of 0°, 90° and 180° may be used as the first, second and third azimuth positions 202, 204, 206, respectively, however, other sets of positions and position orders may also be used. Record the first gyro output, $y_1$, at the first or start position 202. Rotate or reposition the azimuth positioner 108 to the second azimuth position 204 and record a second gyro output, $y_2$. Then rotate or reposition the azimuth positioner 108 to the third azimuth position 206 and record a third gyro output, $y_3$. As the true North direction 200 is unknown initially, the first position (0° in this example) is assumed to be true North 200. The azimuth heading 208 relative to true North 200, i.e. the difference between the first position and the actual true North 200, can be determined as follows.

The first, second and third gyro outputs of the example first, second and third azimuth positions 202, 204, 206 are defined from the following set of equations.

$$y_1 = \Omega \cos \lambda \cos \vartheta + \Omega_b$$

$$y_2 = \Omega \cos \lambda \sin \vartheta + \Omega_b$$

$$y_3 = \Omega \cos \lambda \cos \vartheta + \Omega_b$$

where, $\Omega$ is the earth rotation rate, $\lambda$ is the latitude, $\Omega_b$ is the gyro bias and $\vartheta$ is the azimuth heading 208 of the instrument boresight 102 relative to true North 200. The azimuth heading 208 can therefore be computed from the following equation.

$$\vartheta = \arctan\left[\frac{2y_2 - (y_1 + y_3)}{y_1 - y_3}\right]$$

Required gyro bias stability, $\Omega_n$ for a 0.1° alignment accuracy at Los Angeles is given by the following calculation.

$$\Omega_n = \frac{0.1}{180} \pi \Omega \cos \lambda = 0.02°/\text{hr}$$

Similarly, first, second and third accelerometer 120 outputs, $z_1$, $z_2$ and $z_3$, at the first, second and third azimuth positions 202, 204, 206 can be used to adjust the tilt of the azimuth axis to true vertical. The tilt of the azimuth axis is adjusted until the first, second and third accelerometer 120 outputs are substantially identical to the accelerometer bias as outlined by the following analysis.

The first, second and third accelerometer 120 outputs are determined from the following equations.

$$z_1 = g \sin \epsilon + a_b$$

$$z_2 = g \sin \delta + a_b$$

$$z_3 = g \sin \epsilon + a_b$$

where, g is the gravitational constant, $\epsilon$ and $\delta$ are tilt angles as defined in FIG. 2 and $a_b$ is the accelerometer bias. The accelerometer bias is determined as $$a_b = \frac{z_1 + z_3}{2}$$

The tilt angles, $\epsilon$ (about the $y_2$ direction) and $\delta$ (about the $y_1$ direction), are now adjusted until accelerometer readings, $z_1$ or $z_3$ and $z_2$ are equal to $a_b$, thereby aligning the azimuth axis to the true local vertical.

The desired boresight 102 position for the instrument 104 can now be set relative to local vertical and true North 200 using dial indicators on the elevation and azimuth positioners 106, 108. The dial indication for azimuth is set to $\vartheta_0 - \vartheta$, where $\vartheta_0$ is the desired azimuth direction.

In the case of locating a geostationary satellite, the desired boresight 102 position for the instrument 104 is determined from the known satellite position and the position of the instrument 104 on the Earth.

Figure 3A:
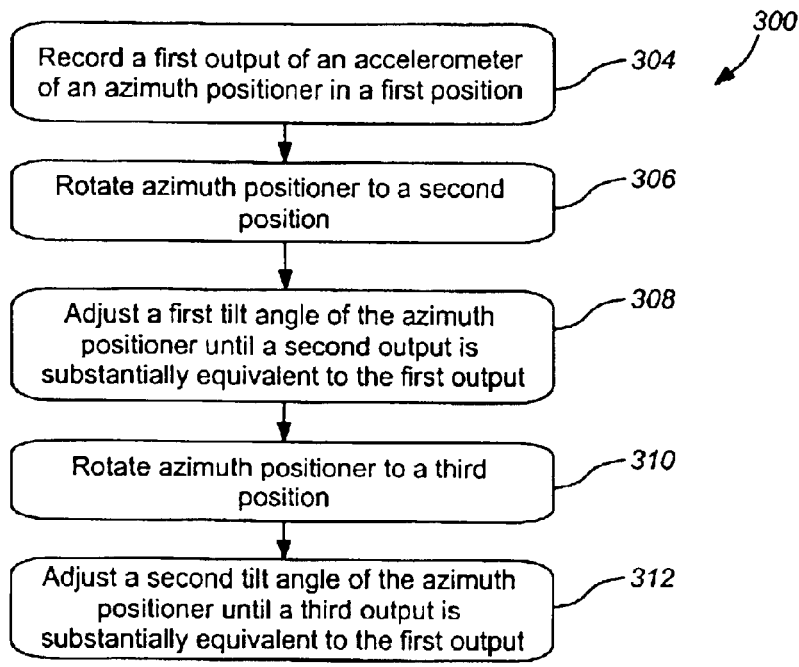
FIGS. 3A and 3B are flowcharts of typical alignment methods of the vertical 300 and azimuth 302, respectively. A local vertical is determined by a step of recording 304 a first output of an accelerometer 120 of an azimuth positioner 108 having an instrument boresight azimuth heading in a first position, a step of rotating 306 the azimuth positioner 108 to a second position, a step of adjusting 308 a first tilt angle of the azimuth positioner 108 until a second output of the accelerometer 120 is substantially equivalent to the first output, a step of rotating 310 the azimuth positioner to a third position and a step of adjusting 312 a second tilt angle of the azimuth positioner 108 until a third output of the accelerator 120 is substantially equal to the first output. An instrument boresight azimuth heading is determined by a step of recording 314 a first output of gyro 118 of a azimuth positioner 108 having an instrument boresight 102 azimuth heading in a first position 202, a step of rotating 316 the azimuth positioner 108 to a second position 204, a step of recording 318 a second output of the gyro 118, a styep of rotating 320 the azimuth positioner 108 to a third position, a step of recording 322 a third output of the gyro 118 and a step of determining the azimuth heading 324 relative to true North 200 from the first, second and third output. Although alignment of the local vertical and azimuth can be determined in any order, a more accurate result is achieved when the vertical alignment is performed before the azimuth alignment.
Figure 3B:
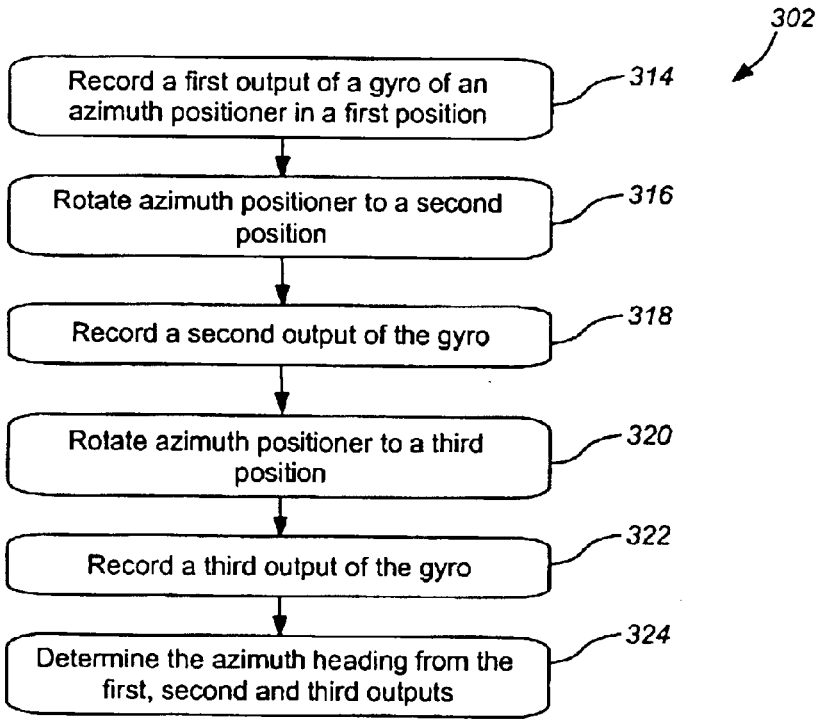

FIGS. 3A and 3B are flowcharts of typical alignment methods of the vertical 300 and azimuth 302, respectively. A local vertical is determined by a step of recording 304 a first output of an accelerometer 120 of an azimuth positioner 108 having an instrument boresight azimuth heading in a first position, a step of rotating 306 the azimuth positioner 108 to a second position, a step of adjusting 308 a first tilt angle of the azimuth positioner 108 until a second output of the accelerometer 120 is substantially equivalent to the first output, a step of rotating 310 the azimuth positioner to a third position and a step of adjusting 312 a second tilt angle of the azimuth positioner 108 until a third output of the accelerometer 120 is substantially equal to the first output. An instrument boresight azimuth heading is determined by a step of recording 314 a first output of a gyro 118 of an azimuth positioner 108 having an instrument boresight 102 azimuth heading in a first position 202, a step of rotating 316 the azimuth positioner 108 to a second position 204, a step of recording 318 a second output of the gyro 118, a step of rotating 320 the azimuth positioner 108 to a third position, a step of recording 322 a third output of the gyro 118 and a step of determining the azimuth heading 324 relative to true North 200 from the first, second and third output. Although alignment of the local vertical and the azimuth can be determined in any order, a more accurate result is achieved when the vertical alignment is performed before the azimuth alignment.

Dithered Instrument Alignment Device

In another embodiment, an instrument alignment device may use dithering to perform the alignment function for a gyro compass. Such a dithered alignment device may have the overall configuration previously described.

Figure 4:
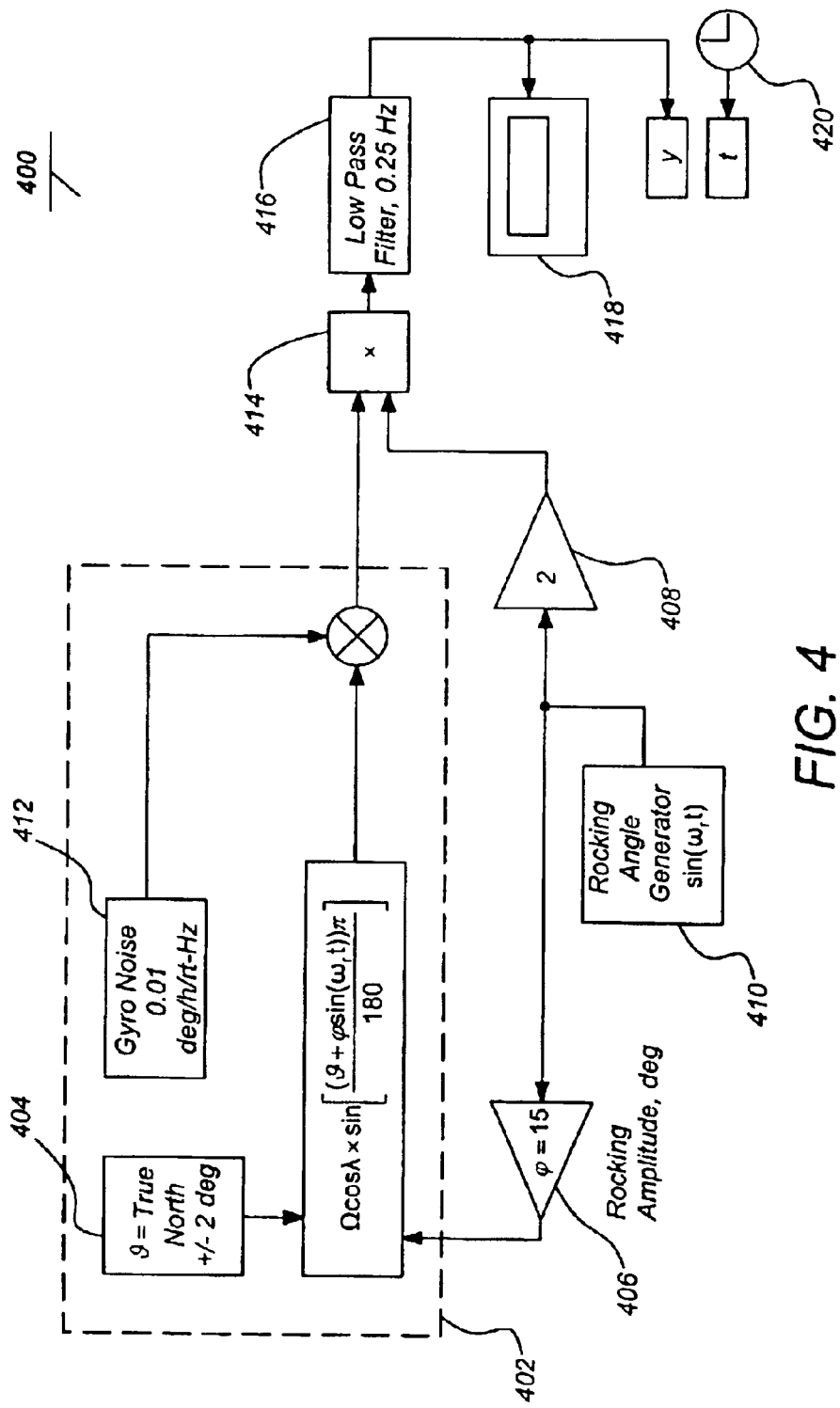
FIG. 4. is a block diagram of a typical dithered gyro compass.

FIG. 4. is a block diagram of a typical gyro compass with dither drive 400. The gyro 402 is dithered about the azimuth axis with an amplitude, $\phi$, and a frequency, $\omega_r$. Dithering about the azimuth may be accomplished with a rocking angle generator 410 communicatively coupled to a gyro 402 or demodulator along with the Earth rate input 404. The rocking angle generator 410 is also communicatively coupled to a multiplier 414 with the output from the gyro 402. The rocking angle generator 410 may be coupled via mechanical driver 406 to the gyro 402 and via amplifier 408 to the multiplier 414. Gyro noise 412 is present in the output from the gyro 402. The signal output of the multiplier may then be communicatively coupled to a filter 416, such as a low pass filter. The filtered output of the low pass filter 416 is then coupled to a display 418 of the azimuth position. In addition, a clock 420 may be used to determine when sufficient time has passed for filtered output and the displayed position to stabilize. This device identifies true North 200, from which the desired antenna azimuth could be positioned. The operation of the dithered instrument alignment device is outlined in the following analysis.

With horizontal Earth rate component at latitude, $\lambda$, oriented at $\vartheta$ with respect to a nominal sense axis, the gyro output in °/hr is:

$$y = \cos \lambda \Omega \sin(\vartheta + \phi \sin(\omega_r t))$$

Demodulating with the gyro 402 with $$y_d = 2 \sin(\omega_r t)$$

the gyro 402 output to the multiplier 414 is $$y = \cos \lambda \Omega [\sin \vartheta \cos(\phi \sin(\omega_r t)) + \cos \vartheta \sin(\phi \sin(\omega_r t))]2 \sin(\omega_r t)$$

and the mean value is $$y_m = \cos \lambda \Omega \cos \vartheta \phi.$$

The slope is $$\frac{dy_m}{d\vartheta} = -\cos\lambda\Omega\varphi \text{ at } \vartheta = \pi/2.$$

The rate error for 0.1° sensitivity at Los Angeles, $\lambda=38°$ with $\phi=15°$ is 0.0054°/hr, for example. A 0.01°/hr/√Hz gyro rate resolution would require a 0.25 Hz bandwidth or a 1.4 second response time.

Figure 5:
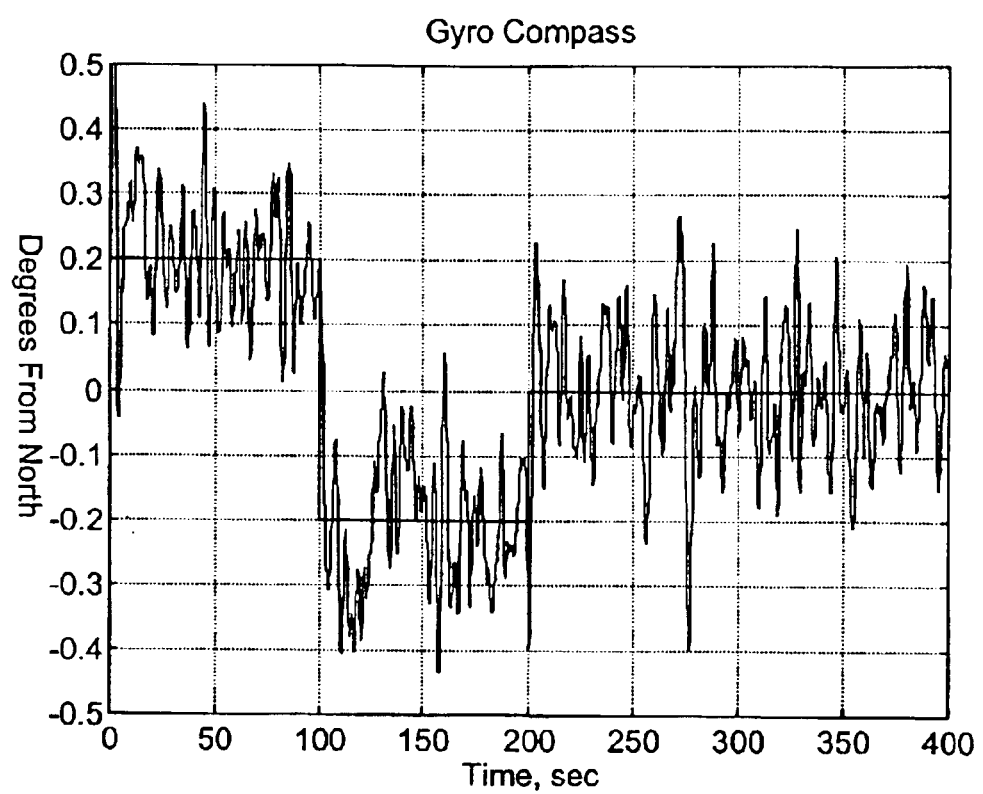
FIG. 5 illustrates an example of a demodulated signal for a dithered gyro compass aligned within ±0.2° of true North and then aligned to true North after 200 seconds of time.

FIG. 5 illustrates an example of a demodulated signal. The plot shows an initial position of 0.2° from true North 200 and a final true North 200 position within 200 seconds.

Rotating Antenna Alignment Device

Another embodiment of the present invention is a rotating alignment device for a boresight 102 of an instrument 104 that must be aligned with respect to Earth coordinates defined by the local vertical and the direction of Earth rotation.

Figure 6:
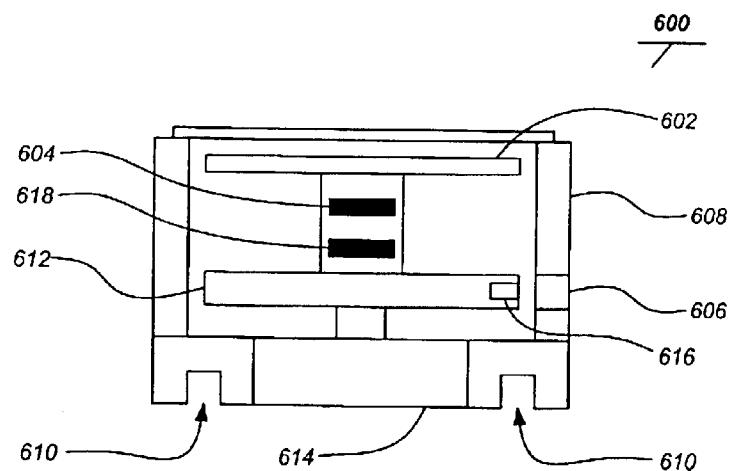
FIG. 6 is a schematic diagram of a typical rotating alignment device of the invention.

FIG. 6 is a schematic diagram of a typical rotating alignment device of the invention. The typical embodiment uses inexpensive micromachined sensors to measure the projection of the local gravity vector and Earth rotation rate onto a measurement display 602 plane defined by a turntable 612 rotated by a motor 614. A sensor 802 comprising an accelerometer 618 and gyro 604, co-aligned and parallel to the rotation plane of the turntable 612, is rotated at a suitable rate, typically >1 Hz. Thus, low bias drift due to sensor thermal and other variations is eliminated and the sensor 802 can provide the two axes of information required. An index pole 616 and coil 606 or other encoders around the turntable 612 can be used to maintain a constant rate of rotation and provide an in-phase and quadrature signal for demodulation of the sensed acceleration and rate into two Earth fixed axes. The orientation of these axes can be arranged by adjusting the demodulation phasing so that one of the axes is the reference direction (R) for a projection of the instrument boresight 102 on the azimuth rotation plane. The entire apparatus may be enclosed in a housing 608 with holes 610 for alignment of the device 600.

Figures 7A, 7B, 7C:
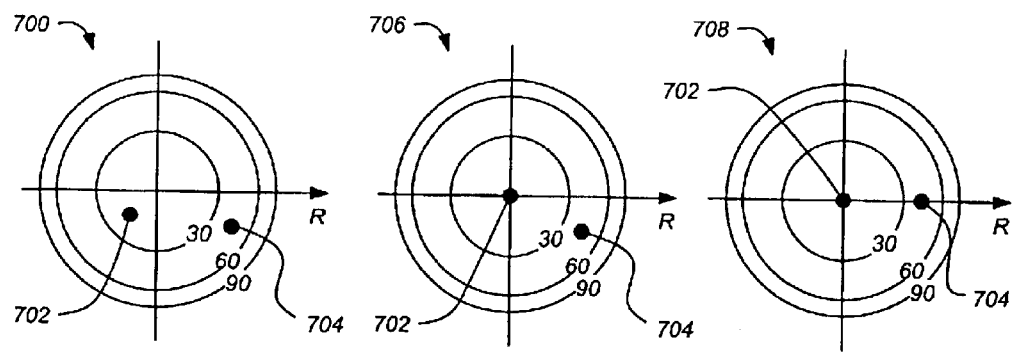
FIGS. 7A–7C are examples of the display of a rotating alignment device before vertical post and azimuth alignment, after post alignment and after azimuth alignment, respectively.

FIGS. 7A–7C are examples of the display 602 of a typical rotating alignment device 600. FIG. 7A shows the display 602 before vertical post and azimuth alignment. The gravity vector 702 and Earth rate vector 704 are shown on the display out of position. FIG. 7B shows the display 602 after post alignment with the gravity vector 702 centered on the display. Finally, FIG. 7C shows the display 602 after azimuth alignment with the Earth rate vector 704 aligned to the reference direction (R).

The device 600 may be used to align an instrument 104 vertical post 112 to be a true vertical by aligning the turntable 612 rotation axis with the post axis and then tilting the post 112 until the in-plane projection of sensed acceleration is nulled. An azimuth axis of the instrument 104 can also be the post axis. Then the azimuth position of the antenna boresight 102 can be aligned to the desired direction relative to true North 200 by positioning the antenna so as to null a component of the sensed Earth rate projection. A sensitive vernier display can be utilized for final positioning by presetting the demodulation phase according to the desired azimuth angle.

Figure 8:
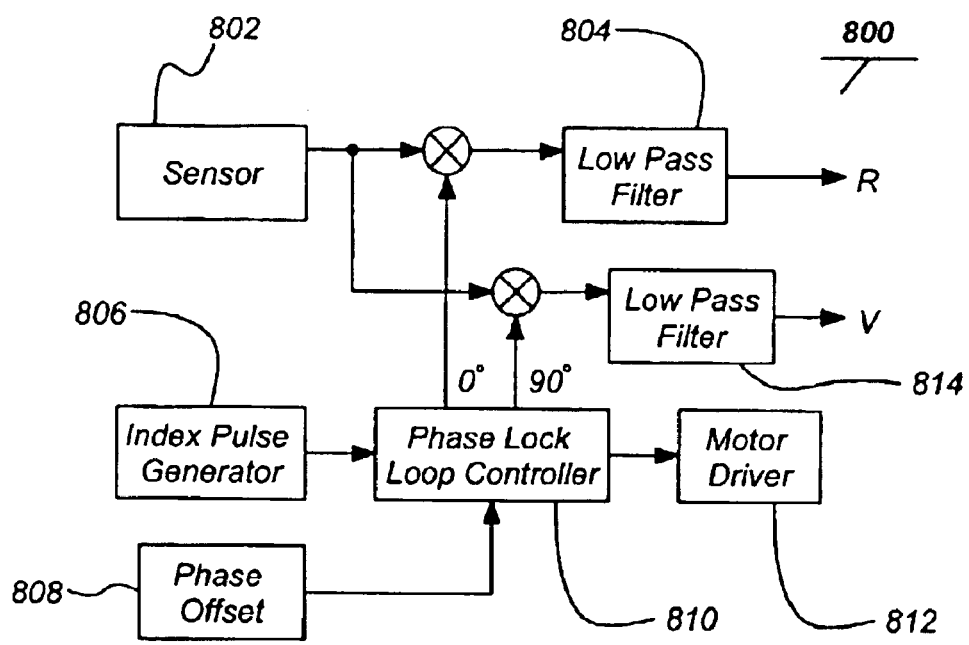
FIG. 8 is a block diagram of a typical rotating alignment device of the invention.

FIG. 8 is a block diagram of a typical rotating alignment device 600 of the invention. An index pulse generator 806, such as an index coil 606 and pole 616, is coupled to a phase lock loop controller 810 which receives a phase offset 808 input. The phase lock loop controller 810 in turn provides two outputs substantially 90° out of phase which are each coupled with the sensor 802 and fed to filters 804, 814, typically low pass filters as well as an output for the motor driver 812 for the motor 614. One filter 814 produces an output for the gravity vector 702 position on the display 602. The other filter 804 produces an output for the Earth rate vector 704 position on the display 602.

The elevation direction of an instrument 104, such as an antenna, can be set by mounting the rotating alignment device 600 on the instrument 104 with the turntable 612 axis parallel to the azimuth axis and then positioning the instrument 104, by adjusting the vertical post 112 for example, until the azimuth axis is parallel to the local vertical direction, sensed by the accelerometer. The instrument boresight azimuth is adjusted until the in-plane Earth rate vector has the desired orientation relative to the instrument boresight 102. A sensitive vernier display can be implemented for final positioning by presetting the demodulation phase 808 according to the desired azimuth angle.

For a 0.1° alignment accuracy the required sensitivity is approximately 1/600 the Earth rate of approximately 0.03°/hr and 1/600 g (approximately 1.6 mg). With a typical 2 mm gyro design noise of 0.1°/hr/rt-Hz at greater than 1 Hz rotation, the synchronously detected Earth rate signal error is 0.03°/hr in a 0.1 Hz bandwidth.

The comparable accelerometer noise performance requirement is greater than 5 mg/rt-Hz. The response time is 3.5 sec for the required accuracy of 0.1° at the Equator or 7 sec at a 60° latitude. Improved noise performance of inertial sensors is much easier to achieve at lower cost than improved bias drift. For example, doubling the inertial sensor size reduces noise approximately eight fold.

The rotating alignment device 600 can be the size of a compass and have a simple readout display 602 suitable for manual alignment. The turntable 612 and housing 608 may be plated assemblies, similar to those developed for the computer hard drive market. The microelectronics to implement the device may be easily integrated into a 2 mw, 2 mm$^2$ digital ASIC. Various mounting arrangements on or off the turntable 612 for the motor coils, control electronics and display are possible.

It should be understood that the invention may be used with any high performance gyro or accelerometer, such as microgyros and/or microaccelerometers. Generally, rate sensors may also be implemented in the invention with the signal appropriately conditioned by methods known to those skilled in the art. Some tunneling sensors may also be employed in the foregoing applications as well.

Those skilled in the art will recognize many modifications may be made to this configuration without departing from the scope of the present invention. For example, those skilled in the art will recognize that any combination of the above components, or any number of different components and other devices, may be used with the present invention.

Conclusion

This concludes the description of the preferred embodiments of the present invention. In summary, the present invention describes apparatuses and methods for determining the boresight 102 heading of an instrument 104.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for determining an instrument boresight azimuth heading, comprising:
   a gyro having a first input and a first output;
   a rocking angle generator having a second output, wherein the second output is communicatively coupled to the first input of the gyro, producing a demodulated signal at the first output;
   a signal multiplier communicatively coupled to the second output and the demodulated signal for multiplying the second output and the demodulated signal and producing a multiplied signal; and
   a filter communicatively coupled to the multiplied signal for producing a filtered output.

2. The apparatus of claim 1, further comprising a display for displaying the filtered output.

3. The apparatus of claim 1, further comprising a clock for determining when the filtered output has stabilized.

* * * * *